UNITED STATES PATENT OFFICE.

JAMES R. CAMPBELL, OF WEST NEW BRIGHTON, NEW YORK.

COMPOSITION FOR SOFTENING BOILER FEED-WATER.

1,278,435. Specification of Letters Patent. Patented Sept. 10, 1918.

No Drawing. Application filed July 23, 1914. Serial No. 852,591.

*To all whom it may concern:*

Be it known that I, JAMES R. CAMPBELL, a citizen of the United States, residing in West New Brighton, county of Richmond, and State of New York, have invented a certain new and useful Composition for Softening Boiler Feed-Water, of which the following is a specification.

This invention is a composition for softening boiler feed water, and, in its entirety, embodies the following ingredients:—Carbonate of soda, unslaked lime, silicate of soda, caustic soda, bichromate of soda, and tri-phosphate of soda.

A further feature of the invention consists in combining the ingredients in solid form, preferably of brick shape, whereby the cost of transportation is diminished and the use of the product facilitated.

The preferred proportions of the several ingredients, by weight, are as follows:—

| | |
|---|---|
| Carbonate of soda | 16 pounds |
| Lime | 3 pounds |
| Silicate of soda | 3 pounds. |
| Caustic soda | 4 pounds |
| Bichromate of soda | 4 pounds |
| Tri-phosphate of soda | 2 pounds |

In compounding the mixture, the several ingredients are added to the silicate of soda, the latter being in viscous form, and then sufficient water added to moisten the entire mass, whereupon it is pressed into bricks.

The compound is used in the customary way, viz., by adding it to the feed water prior to its introduction into the boiler. In treating some waters, it will be understood that it is not necessary to use all of the ingredients specified; *e. g.*, in some cases, I may omit the tri-phosphate of soda, while, in others, I may omit the lime and caustic soda. Moreover, the invention is not restricted to the precise proportions specified, but may be varied within reasonable limits. Then again, in certain cases, equivalents may be used in lieu of the ingredients specified. *E. g.*, it is manifest that caustic potash is an equivalent of caustic soda, although it is preferred to use the latter for more economical reasons. With some waters, I have secured particularly good results by using a composition consisting of carbonate of soda, silicate of soda, caustic soda, and bichromate of soda.

By combining the ingredients in the form specified, I find that they are much more permanent and less susceptible to decomposition or change, than when handled in the powdered form or in solution. Many other advantages flow from using the composition in brick form, all of which will be apparent to those skilled in the art. So far as I am aware, no one has heretofore combined ingredients for softening water in brick form, and, for the reasons specified, among others, many advantages result therefrom.

I have also found that a convenient and efficient way of treating the water in the boiler directly is to put the composition up in cylindrical tins or cans, the sides of which are perforated whereby the tin can be hung on the stay rods in the boiler. In this manner, the composition is gradually dissolved, without producing any unusual foaming or disturbance of the water in the boiler.

Having thus fully described the invention, what I claim as new, and desire to secure by Letters Patent, is:—

1. A composition for softening water consisting of carbonate of soda, lime, silicate of soda, caustic soda, bichromate of soda, and tri-phosphate of soda.

2. A composition for softening water consisting of carbonate of soda, lime, silicate of soda, caustic soda, bichromate of soda, and tri-phosphate of soda combined in solid form.

3. A composition for softening water consisting of carbonate of soda, silicate of soda, caustic soda, and bichromate of soda.

4. A composition for softening water consisting of an alkali, bichromate of soda, and tri-sodium phosphate.

5. A composition for softening water consisting of carbonate of soda, silicate of soda, caustic soda, and bichromate of soda combined in solid form.

6. A composition for softening water consisting of carbonate of soda, silicate of soda, caustic soda, bichromate of soda, and tri-sodium phosphate combined in solid form.

In testimony whereof I have signed my name to this specification in the presence of two subscribing witnesses.

JAMES R. CAMPBELL.

Witnesses:
JAS. H. GRIFFIN,
CORNELIUS ZABRISKIE.